US006525547B2

(12) United States Patent
Hayes

(10) Patent No.: US 6,525,547 B2
(45) Date of Patent: Feb. 25, 2003

(54) CAPACITIVE TWO DIMENSIONAL SENSOR

(75) Inventor: Robert S. Hayes, Lawndale, CA (US)

(73) Assignee: Sentronics Corporation, Torrance, CA (US)

(*) Notice: Subject to any disclaimer, the term of this patent is extended or adjusted under 35 U.S.C. 154(b) by 0 days.

(21) Appl. No.: 09/837,828

(22) Filed: Apr. 17, 2001

(65) Prior Publication Data

US 2002/0152048 A1 Oct. 17, 2002

(51) Int. Cl.[7] .......................... G01R 27/26; G06K 9/00
(52) U.S. Cl. ........................... 324/662; 382/124
(58) Field of Search ............................ 324/662, 671, 324/678, 690; 382/124, 127

(56) References Cited

U.S. PATENT DOCUMENTS 6,317,508 B1 * 11/2001 Kramer et al. ............. 235/439
6,346,739 B1 * 2/2002 Lepert et al. ............... 257/532

* cited by examiner

Primary Examiner—Christine Oda
Assistant Examiner—J Kerveros
(74) Attorney, Agent, or Firm—Irving Keschner

(57) ABSTRACT

A two dimensional array of electrodes for sensing the presence or absence of the ridges in a fingerprint through capacitive measurements. Exciting signals are supplied from outside the array which allows the array to be fabricated from metal and insulator layers on non-semiconductor substrates such as glass or plastic using normal deposition and patterning techniques. A top protective layer consisting of hard, rigid material may be provided. The required electronic circuits are preferably located around the periphery of the array.

12 Claims, 9 Drawing Sheets

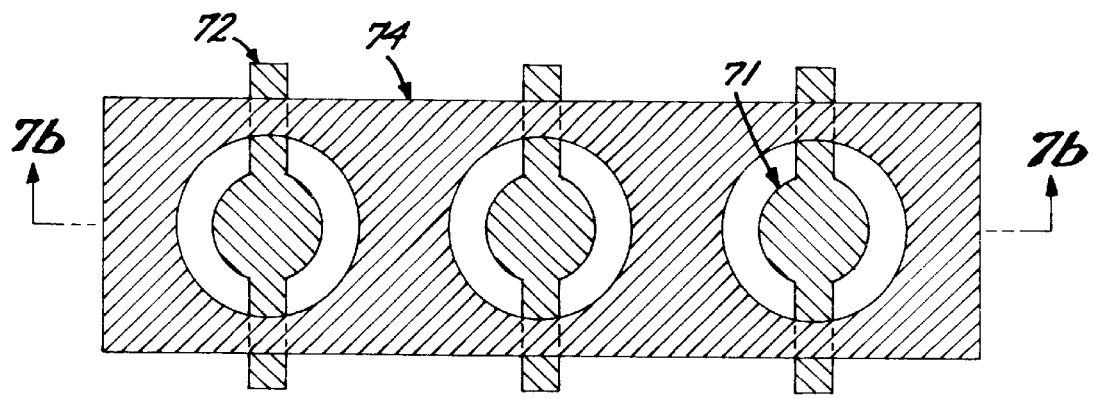
FIG. 7a
FIG. 7b
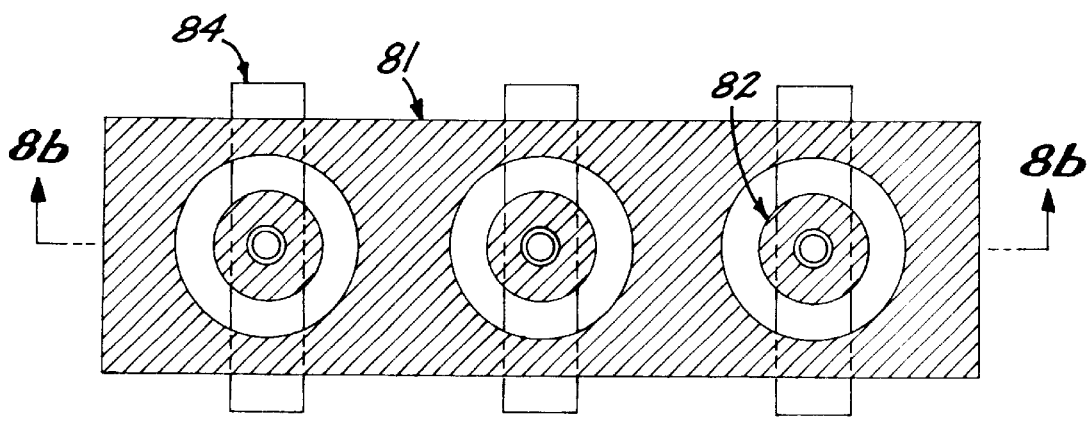
FIG. 8a
FIG. 8b

CAPACITIVE TWO DIMENSIONAL SENSOR

BACKGROUND OF THE INVENTION

1. Field of the Invention

The present invention relates to a new device using capacitance to detect fingerprint characteristics which is simpler and less expensive to fabricate than previous devices used for this purpose.

2. Description of the Prior Art

Previous capacitive fingerprint sensors have used arrays of electrodes with individual electronic circuits associated with each set of electrodes in the array. An element in the array may have one electrode, with the finger representing a grounded capacitor plate as described in U.S. Pat. No. 6,016,355 or it may have two electrodes with the finger representing a floating capacitor plate as described in another prior art device. In both cases, the change in capacitance due to a fingerprint feature is sensed by an individual electronic circuit located adjacent to or underneath the electrodes. The output of these individual circuits are electronically multiplexed together to form an image of the fingerprint.

The electronic circuits must be built as an integrated circuit on a suitable substrate, most likely silicon. The size of the array is determined by the size of the human finger, and is ideally at least 1 inch high by 0.75 inch wide to accommodate an adult thumb. A semiconductor chip of this size is expensive to fabricate and difficult to produce with a high yield of good devices. The resolution desired is set by the dimensions of the ridges and valleys of the fingerprint and is in the neighborhood of 500 elements per inch, or 250,000 elements per square inch. A typical array will require 187,500 separate electronic circuits, one per element, for an array of that is slightly smaller than on square inch.

An alternate approach is to use an array of movable electrodes and to measure the capacitance changes as the electrodes are displaced by the ridges and valleys of the fingerprint as described in U.S. Pat. No. 4,353,056. The electrodes and their support structures can be fabricated using micromachining techniques. The substrate can be either silicon or a non-semiconductor material such as glass. The surface of the array must be protected by a thin layer of material which is thin enough and flexible enough to conform to the ridges and valleys of a fingerprint and yet hard enough to resist physical damage in normal use. This type of array can be operated by selectively driving individual rows of elements and sensing the signals picked up on individual columns, the electronic circuits being placed on the periphery of the array. A typical array will require 500 circuits for driving rows and 375 circuits for receiving column signals, for a total of 875 electronic circuits. This approach is more complex mechanically and simpler electronically.

A third approach is described in U.S. Pat. No. 6,160,904 and is similar to the present invention to the extent that it uses capacitance measurements with an array of electrodes with no underlying active circuits below the electrodes. It differs in that the array senses the finger surface in one axis only, using a linear array of drive electrodes which extend across the finger. Another difference is that one pickup electrode per array located at one end of the array is used, the array having only one conductive layer. This device does not produce a detailed image of the fingerprint, but a signal which is characteristic of the fingerprint. This characteristic signal changes due to spreading of the finger under pressure and to angular misalignment of the finger with the sensor providing unsatisfactory results.

SUMMARY OF THE INVENTION.

The present invention provides an array of electrodes to sense the presence or absence of the ridges in a fingerprint through capacitive measurements. The electrode array does not require individual electronic circuits for each element and can be manufactured solely from metallic conductors and suitable insulators. Exciting signals are supplied from outside the array. This allows the array to be fabricated from metal and insulator layers on non-semiconductor substrates such as glass or plastic using normal deposition and patterning techniques such as, but not limited to, vacuum deposition, sputtering, or vapor decomposition followed by photolithography. The sensor could be made by printing, replication or electroplating means. Since there is no need for deformation, a top protective layer consisting of hard, rigid material can be used. Suitable materials include diamond, silicon dioxide, silicon nitride, aluminum oxide, or other hard material capable of being formed in thin films.

The electronic circuits required can be located around the periphery of the array. These circuits can be fabricated as semiconductor chips, fabricated separately, mounted on the substrate, and connected using thermal an-isotropic bonding (TAB), wire bonding, solder balls, or other suitable method, or, alternately, the electronic circuits can be fabricated on the substrate using thin film techniques similar to those used to fabricate liquid crystal displays.

The present invention can also be used to detect the presence of a different material, such as moisture and chemicals.

BRIEF DESCRIPTION OF THE DRAWINGS

For better understanding of the present invention as well as other objects and further features thereof, reference is made to the following description which is to be read in conjunction with the accompanying drawing wherein:

FIG. 7(a) shows an alternate method of constructing the device without the use of vias in the insulator layers and FIG. 7(b) is a cross-section along line A—A of FIG. 7(a);

FIG. 8(a) shows the device constructed on a thin substrate, with the pickup lines located on the other side of the substrate and FIG. 8(b) is a cross-section along line A—A of FIG. 8(b);

DESCRIPTION OF THE INVENTION

Figure 1A:
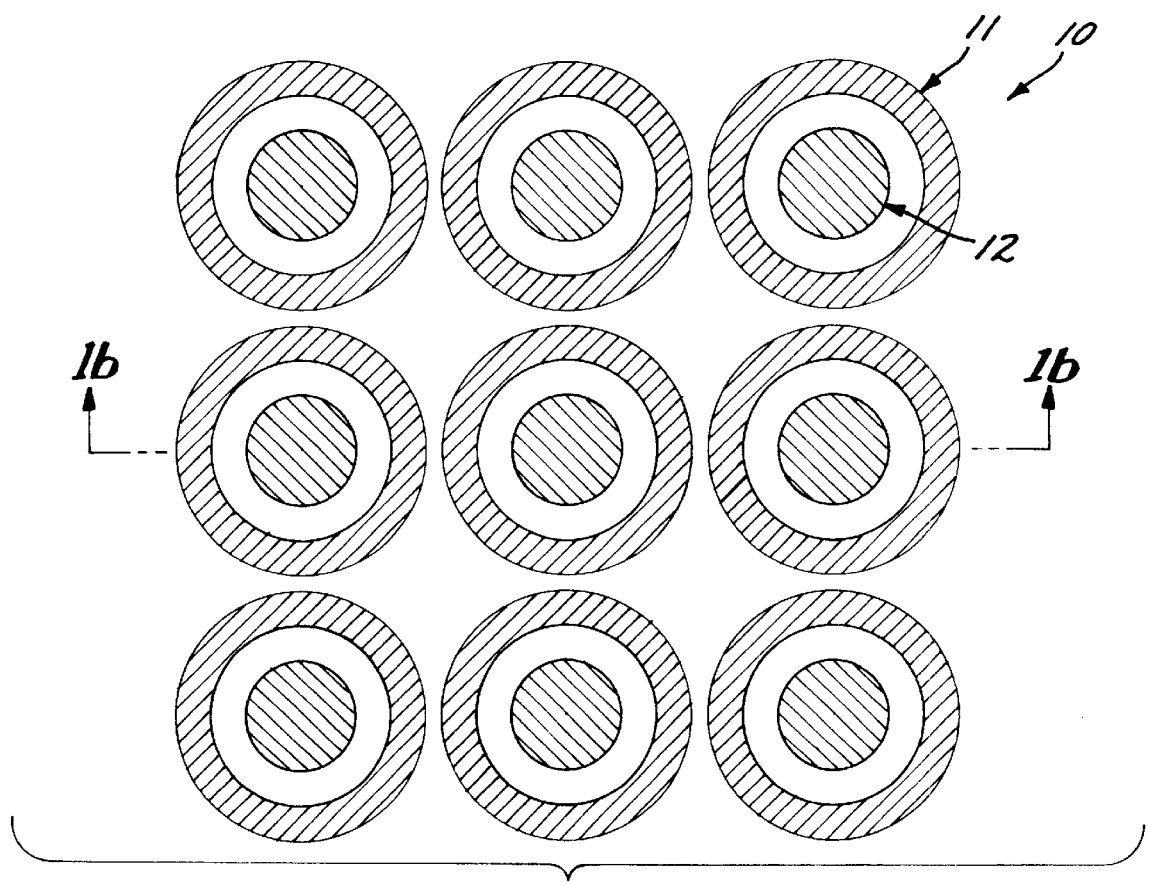
FIG. 1(a) is a top view of a 3 by 3 array of pixels using annular drive electrodes surrounding circular pickup electrodes and FIG. 1(b) is cross-section through one row.

Referring to the figures, each element (pixel) in the sensor array of the present invention has drive and pickup electrodes, the drive electrodes and pickup electrodes not being required to be in a common plane or layer. Optionally, a shield electrode may also be used to provide isolation between drive signals and pick up signals and to control the distance above the surface that the array is sensitive to. The most sensitive area is the gap between the drive and pickup electrodes, the gap being ideally circular in shape to minimize the changes in sensitivity caused by the orientation of the fingerprint features (a square or rectangular gap will provide satisfactory results in most cases). Wider gaps will extend the sensitive area further above the array surface. A shield or other grounded conductors in the gap between the drive and pickup electrodes tends to move the sensitive area closer to the surface. It is preferable that the pickup electrode and the drive electrode are symmetrically placed against each other in the plane of the substrate. Therefore, to minimize the effect of mis-alignments between the different layers, it is preferable, but not necessary, to construct the pickup electrode and the drive electrode by patterning the same conductive layer.

All of the drive electrodes in each row of elements are connected together with conductors (drive lines) and receive the same drive signal. Similarly, all of the pickup electrodes in each column are connected together with additional conductors (pickup lines). The pickup lines are connected to individual electronic circuits outside of the array area. At any given time, one drive circuit is active and all of the pickup circuits are active. The array is scanned by sequentially applying drive signals to each drive line and processing all of the signals from the pickup lines at the same time.

The sensor is constructed by depositing and patterning successive conductive and insulating layers using the techniques presently used for producing integrated circuits or liquid crystal displays. This may be done by starting with an insulating substrate and depositing a first metal layer which is patterned and etched to form the pickup lines. This first metal layer is then covered by a second insulating layer patterned with vias to allow connections between the pickup lines and the pickup electrodes. A third metal layer is then deposited and patterned to form the drive lines, drive electrodes, and pickup electrodes. A fourth insulating layer is then deposited to provide protection for the overall device.

Other methods of constructions are possible. A shield may be interposed between the drive and pickup lines by adding an additional metal layer and an additional insulating layer between the second insulating layer and third metal layer described above. In this case, the first metal layer would contain the pickup lines; the second insulating layer would contain vias; the third metal layer would contain the shield; the fourth insulating layer would contain vias; the fifth metal layer would contain the drive lines, drive electrodes, and pickup electrodes; and the sixth insulating layer would form a protective layer.

A third method of construction would place the pickup lines and pickup electrodes on a first metal layer. This would be followed by a second insulating layer with no vias. A third metal layer would contain the drive lines and drive electrodes. A fourth insulating layer would be added for protection.

The drive lines do not have to be on the same layer as the drive electrodes. A separate layer may be used for the drive lines and connections made to the drive electrodes by using vias or some other method. Similarly, the pickup lines may be on a different layer than the pickup electrodes. If the substrate is thin, some of the metal layers may be moved to the opposite side of the substrate, with connections through substrate made with plated-through holes.

In the preferred embodiment, the drive electrodes are supplied with an external time varying voltage signal from a low impedance source. This reduces the effect of the stray capacitance of the drive electrodes to a tolerable level. Inactive drive lines are grounded to keep the electric field from the active drive line from affecting the rows above or below the active row. The drive signal may be either a sine wave, square wave, or any other suitable waveform.

Also, in the preferred embodiment, the pickup electrodes are connected to charge or current sensitive amplifiers with low input impedance. This reduces the voltage signal on the pickup electrodes and minimizes stray coupling between columns. Further, the low input impedance minimizes the effect of the stray capacitance on the pickup electrodes.

The drive electrodes can be connected in rows by connections on the same conductive layer. The pickup electrodes are connected columns oriented perpendicular to the rows of drive electrodes. These electrodes and their interconnections may be on a different conductive layer from the drive electrodes. In addition, an optional shield conductive layer may be placed between the drive electrodes and the interconnections between the pickup electrodes to reduce the residual signal to a lower value. Suitable insulating layers are placed between the various conductive layers patterned with holes where needed to allow connections between layers.

For many purposes, these measures, combined with a shield between the drive and pickup electrodes, will result in a residual signal that is acceptably low. Optionally, when a shield is not used, or when a very low residual signal is required, a dummy row of electrodes, designed to solely couple to the pickup amplifiers, may be added to the top or bottom of the array, and a signal applied to this row of such a character as to cancel the residual signal from the array.

Figure 1B:
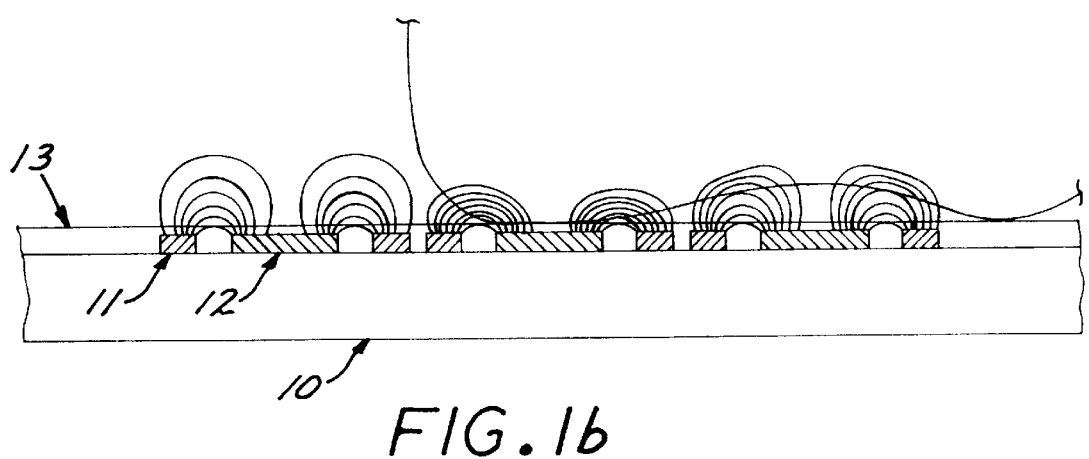

Referring now to FIGS. 1(a) and 1(b), a view of a nine pixel array 10 is illustrated. Each pixel consists of a drive electrode 11 surrounding a pickup electrode 12 and separated from it by a narrow gap, both fabricated on an insulating substrate 10. A thin insulating layer 13 is shown. covering both electrodes. FIG. 1(b) also illustrates the pixels with no finger on the left pixel, a fingerprint ridge on the center pixel, and a fingerprint valley on the right pixel. When no finger is present, there is some electrostatic coupling between the electrodes resulting in a residual capacitance. When a fingerprint ridge is adjacent to the electrodes as shown in the central pixel, there is electrostatic coupling, but this coupling is substantially less than that due to a fingerprint ridge as shown in the right pixel, since the dielectric constant of air is different from that of the flesh of the finger and the bottom of the valley is relatively far away from the electrode structure. These differences in capacitance are separately sensed in each pixel and then combined to create a complete image of the fingerprint.

Figure 2A:
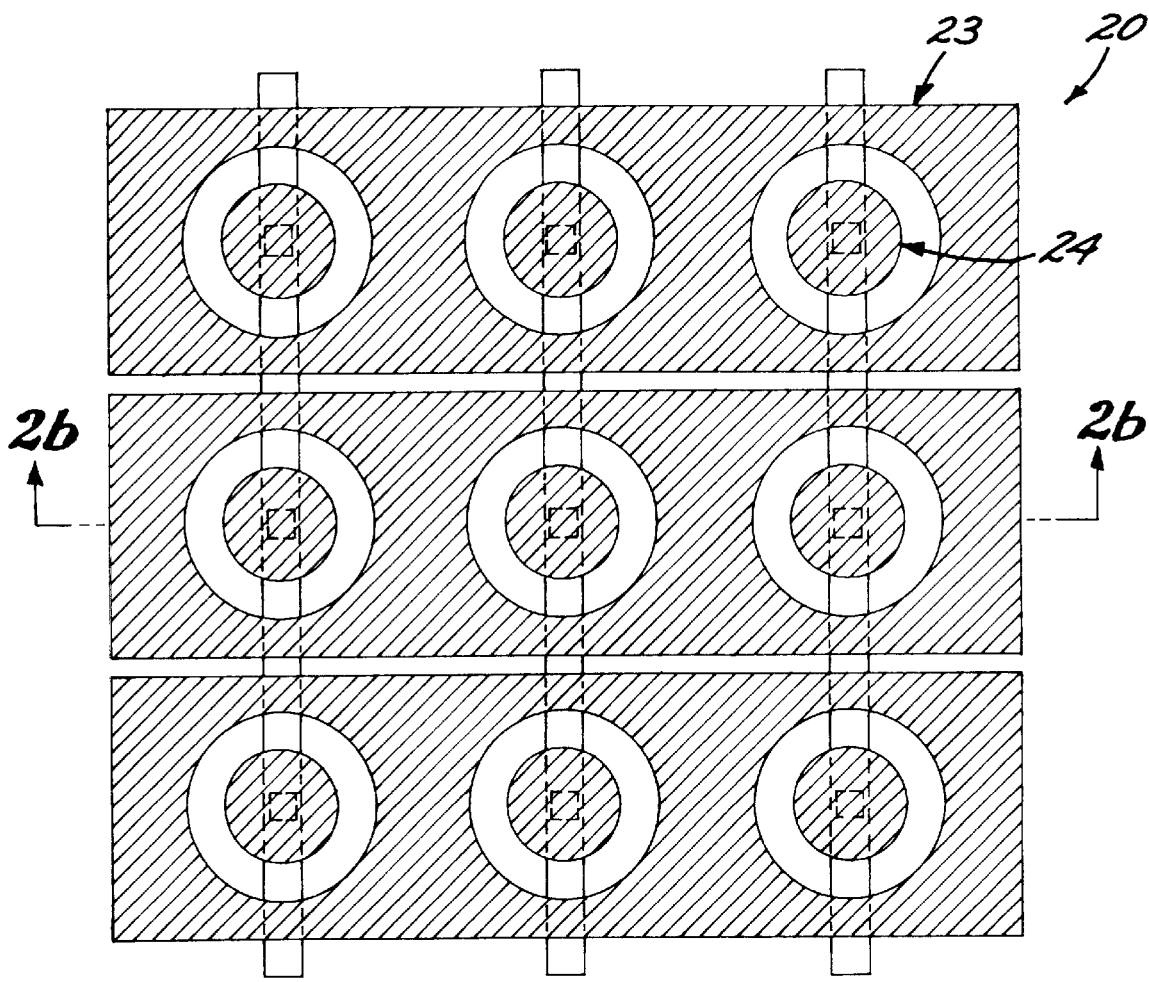
FIG. 2(a) shows a similar array to that of FIG. 1(a) where the drive electrodes have been connected together on the top metal layer and FIG. 2(b) is a cross-section through one row.
Figure 2B:
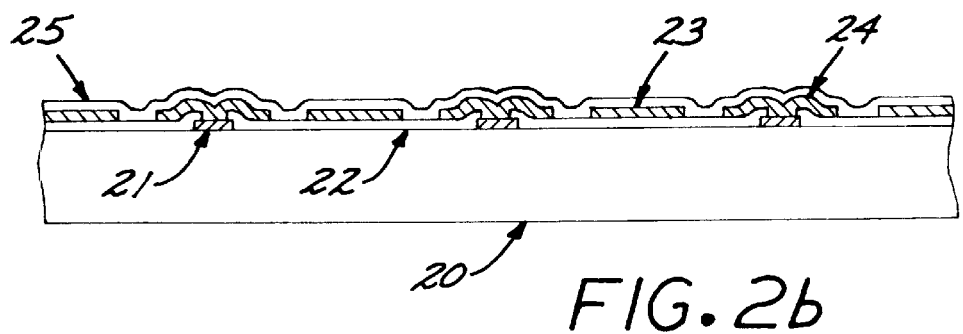

FIGS. 2(a) and 2(b) show an array 20 where the drive and pickup lines are formed by metal layers. The pickup lines 21 are formed in a first metal layer 21 placed or deposited, directly on the insulating substrate 20. A second insulating layer 22 is placed over the first metal layer 21 with vias (holes in a layer of printed circuit board) placed under the position of the pickup electrodes 24. A third metal layer, or deposition step, 23 and 24 is placed on top of the second insulating layer 22 (the drive lines have been combined with the drive electrodes in this case). The drive lines/electrodes 23, and pickup electrodes 24 are formed as part of the third layer. A fourth insulating layer 25 is deposited over the entire array to protect the electrodes from wear and corrosion.

Figure 3A:
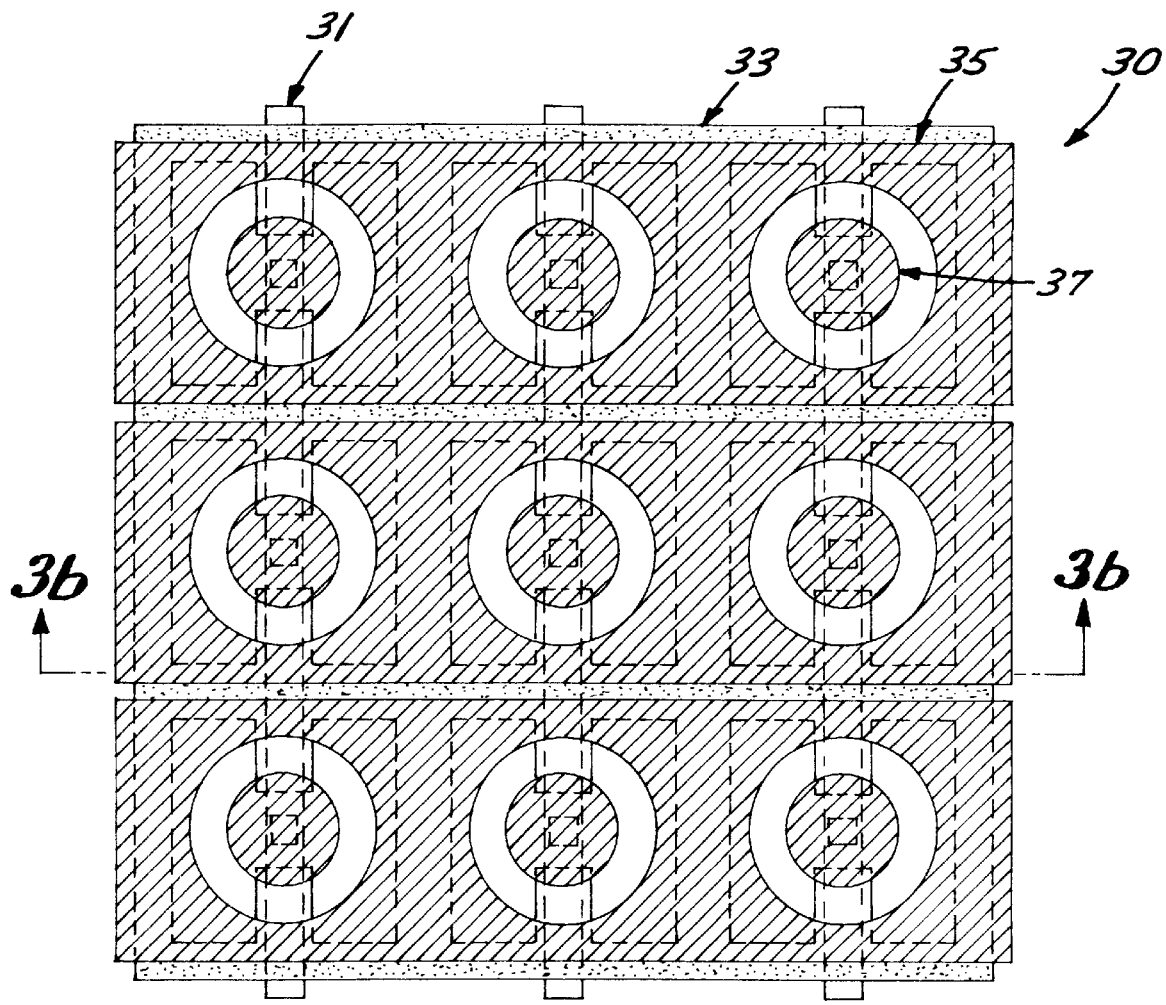
FIG. 3(a) shows an array with a shield interposed between drive lines and the pickup lines to reduce the residual signal due to coupling between these lines and FIG. 3(b) is a cross-section through one row.
Figure 3B:
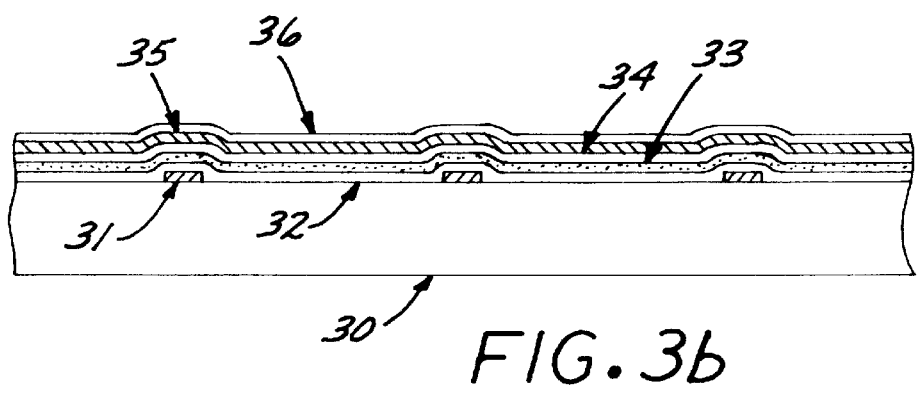

FIGS. 3(a) and 3(b) show an array 30 similar to that shown in FIG. 2 where a conductive shield layer has been added to isolate the pickup lines from the drive signals. The pickup lines 31 are formed in a first conductive layer placed directly on an insulating substrate 30. A second insulating layer 32 is placed over the first conductive layer 31 with vias located beneath the position of the pickup electrodes 37. A third conducting shield layer 33 is placed over the second insulating layer 32 which in turn is deposited on the top of layer 31. The shield layer 33 is provided with holes as needed to allow connections to be made by vias between the pickup lines 31 and the pickup electrodes 37. A fourth insulating layer 34 is placed over the shield layer 33, again with vias to allow connections between the pickup lines 31 and the pickup electrodes 37. A fifth conducting layer is placed over the fourth insulating layer. Both the drive lines and drive electrodes 35 and the pickup electrodes 37 are formed in this layer. A sixth insulating layer 36 is placed over the whole array to provide protection against wear and corrosion.

Figure 4A:
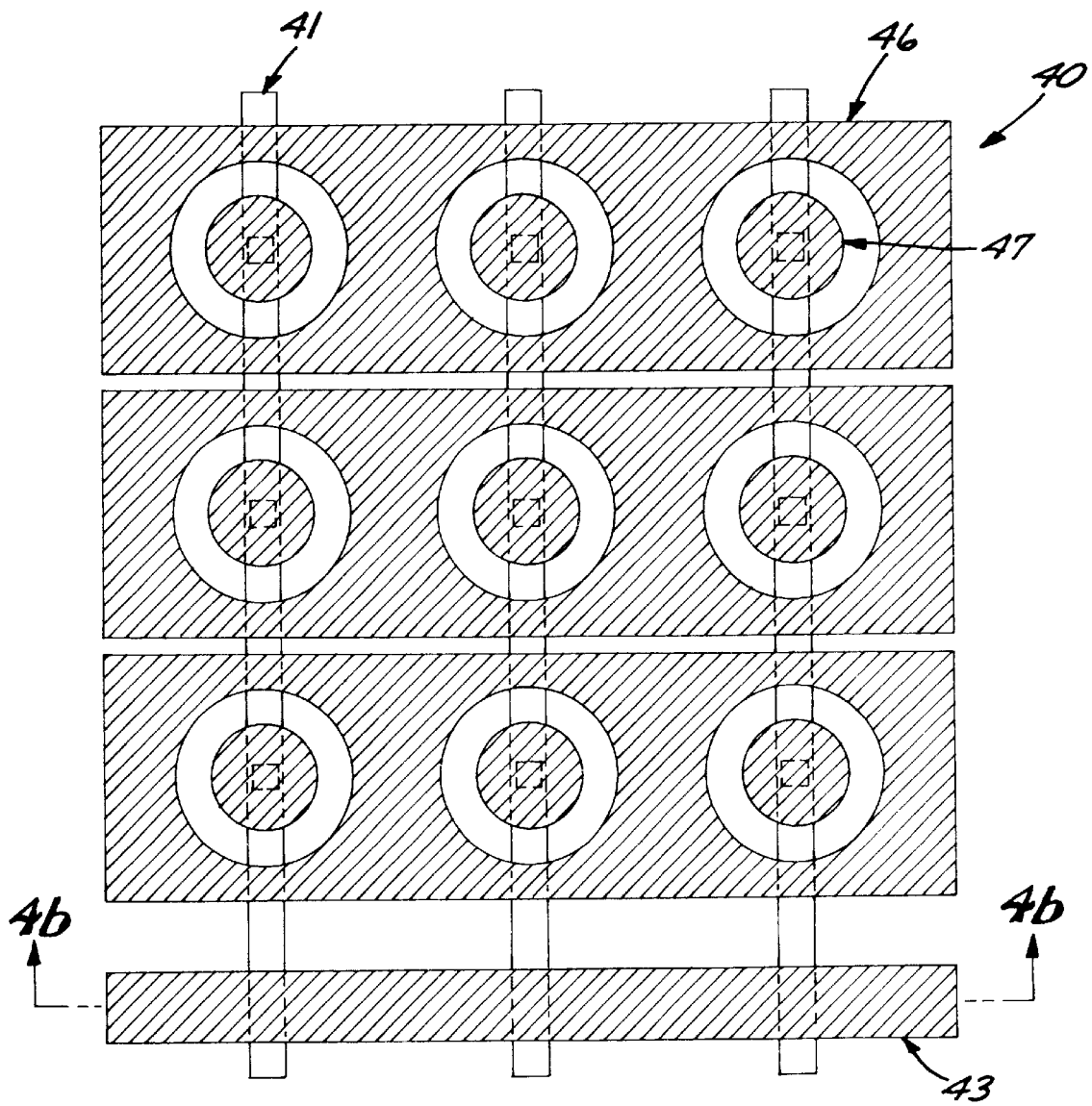
FIG. 4(a) shows an alternative method of reducing residual signals and FIG. 4(b) is a cross-section through one row.
Figure 4B:
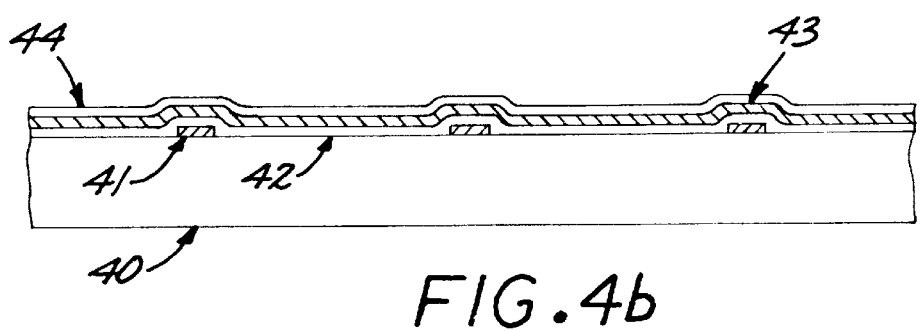

FIGS. 4(a) and 4(b) show an array 40 similar to the array shown in FIG. 2 wherein an additional canceling electrode 43 is positioned outside of the main part of the array. The pickup lines 41 are formed in a first conducting layer 41. This is covered by a second insulating layer 42 with vias as needed to allow connections between the pickup lines 41 and the pickup electrodes 47. A third conductive layer 46 and 47 contain the drive lines and drive electrodes 46, the pickup plates 47, and the canceling electrode 43. The size and position of the canceling electrode 43 is arranged such that the capacitances between the canceling electrode 43 and the pickup lines 41 is approximately the same as the capacitances between one drive line 46 and the pickup lines 41. A voltage opposite in polarity to the drive voltage is applied to the canceling electrode and adjusted to cancel the residual signal on the pickup lines 41. A fourth insulating layer 44 is placed on top of the previous layers for protection against wear corrosion.

Figure 5:
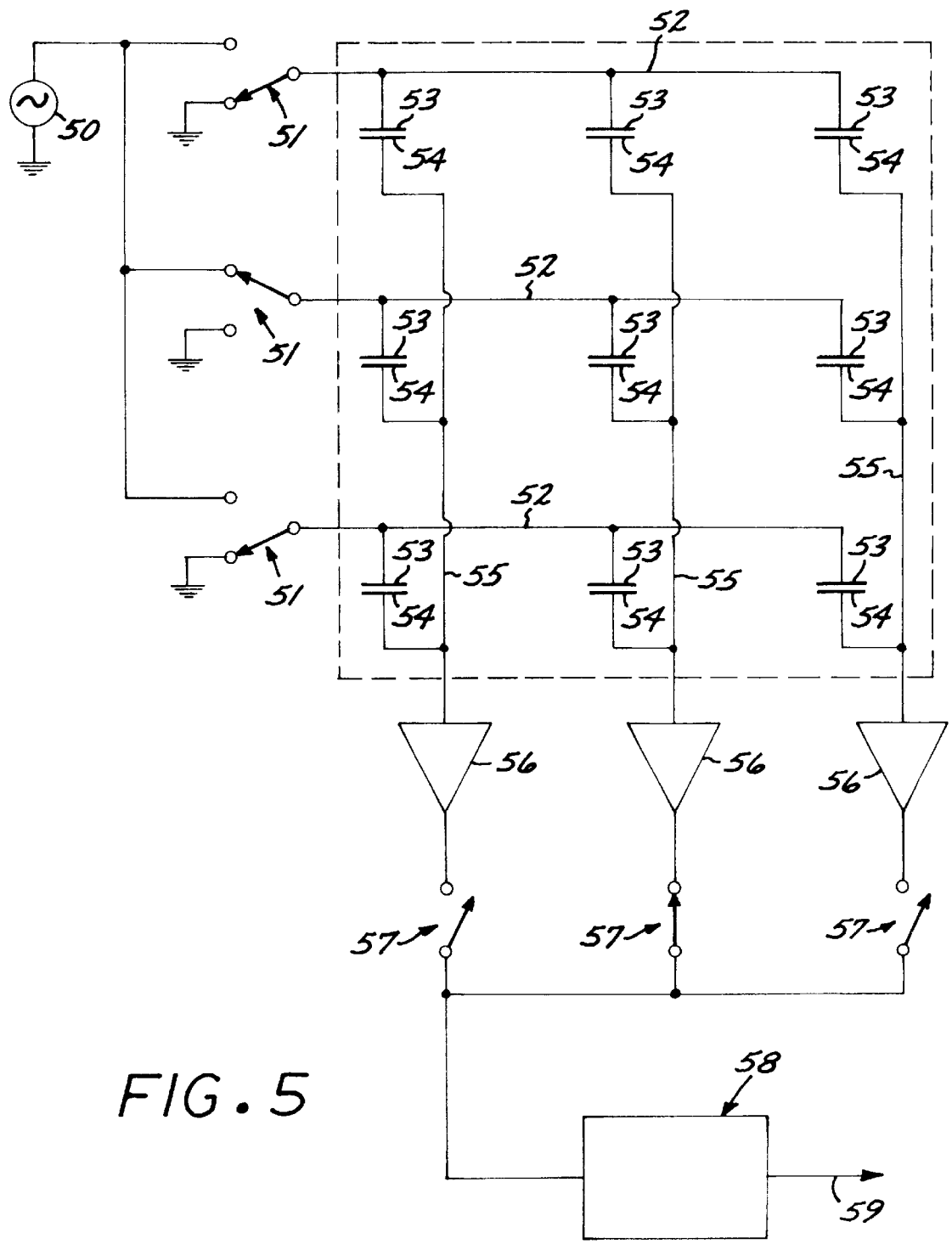
FIG. 5 is a circuit diagram showing the input drive and output signal connections to the sensor array.

FIG. 5 shows the drive signal and output signal connections used with the fingerprint sensor arrays of the present invention. Each drive line 52 has an associated switch 51, which is capable of connecting the drive line to a drive signal source 50 or to ground. Normally, each drive line 51 is sequentially connected to the drive signal source 50, with all other drive lines 51 connected to ground. Each drive line 52 connects to all of the drive electrodes 53 in the pixels of one row. The drive electrode 53 and the corresponding pickup electrode 54 in each pixel form a capacitor, represented by the symbols shown in the figure, whose value changes when a fingerprint feature is adjacent. The pickup electrodes 54 of all the pixels in a column are connected to a pickup line 55. Each pickup line is connected to an amplifier 56 that is sensitive to either current or charge, depending on the nature of the drive signal, and has a low input impedenace. The output signals from the amplifiers 56 are optionally multiplexed together using switches 57 to reduce the number of signal paths. These signals then are processed by conventional signal processing electronics 58 to form the final image on lead 59. The method of signal processing used depends on the choice of drive signal (sine wave, square wave, or pulse), the type of image desired (black and white or gray scale), the type of output signals desired (parallel signals or sequentially scanned raster), and the output interface (linear video, parallel digital, or serial digital).

Figure 6A:
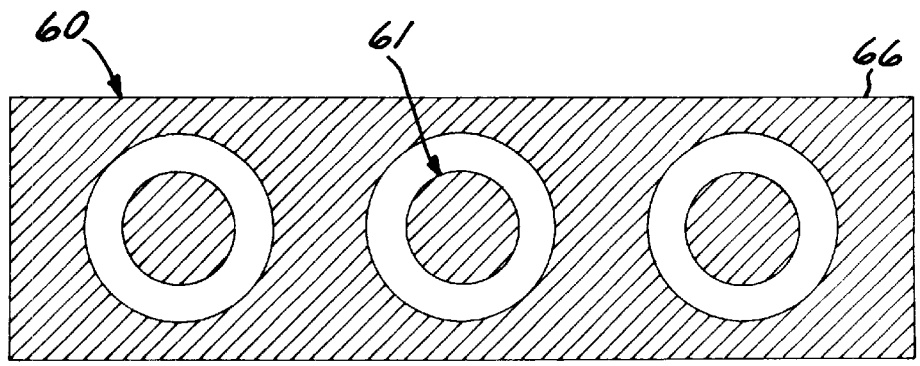
FIGS. 6(a)–6(c) show variation in the geometry of drive and pickup electrodes.
Figure 6B:
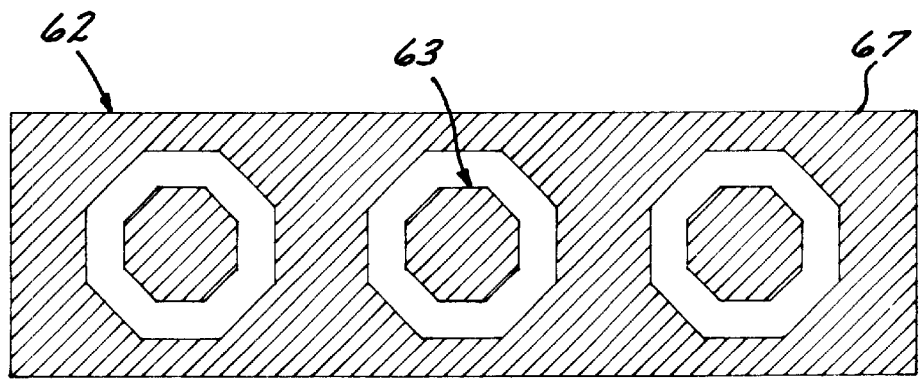
Figure 6C:
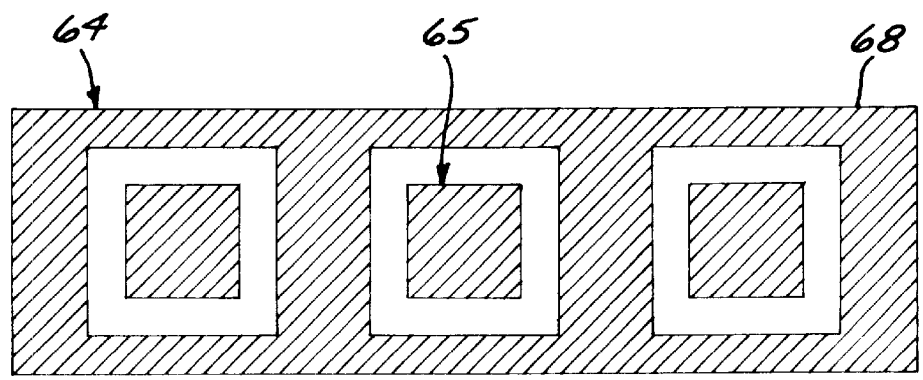

FIGS. 6(a)–6(c) show three variations in the shape of the drive and pickup electrodes. In FIG. 6(a), the drive electrode 60 is circular and has been embedded in a drive line 66. The pickup electrode 61 is circular to give uniform response to a fingerprint feature regardless of its direction. FIG. 6(b) shows octagonal drive electrodes 62 embedded in a drive line 67 with octagonal pickup electrodes 63. This is a close-approximation to a circular shape, but only requires that the mask generating equipment be capable of generating 45 degree angles rather than complete circles. FIG. 6(c) shows square drive electrodes 64 embedded in a drive line 68 with square pickup electrodes 65. This can be generated by equipment limited to 90 degree angles and with fewer operations than the geometric shapes shown in FIGS. 6(a) and 6(b).

FIGS. 7(a) and 7(b) show how a sensor array is constructed without the use of vias in the dielectric layers. The pickup electrodes 71 and the pickup lines 72 are both placed in a first conducting layer on an insulating substrate 70. A second insulating layer 72 covers the pickup electrodes and the pickup lines. A third conducting layer is placed over the second insulating layer 72 and contains the combined drive lines and drive electrodes 74. These layers are covered in turn by a fourth insulating layer 75, which provides protection for the array. This arrangement allows the use of insulating materials which cannot be accurately patterned by standard techniques.

FIGS. 8(a) and 8(b) show how a sensor array is constructed on a thin substrate 80 such as an organic polymer sheet with the pickup lines 84 moved to the bottom side of the substrate 80. The combined drive lines and drive electrodes 81 and the pickup electrodes 82 are formed in a first conducting layer on the top of the substrate 80. These features are covered by a second insulating 83 to provide protection. A second conducting layer is placed on the bottom of the substrate and is used to form the pickup lines 84. These are covered by a second insulating layer 85 placed on the bottom side of the substrate 80. Connections between the pickup electrodes 84 and the pickup lines 85 are made through holes in the substrate. These holes may be formed by chemical etching, laser drilling, or other suitable process. The conductive material in the holes may be deposited by either a chemical plating process of a deposition process. The utility of this device is that the substrate may be thin and flexible, and may be mounted to a flat or curved surface using a suitable adhesive after being manufactured.

Figure 9A:
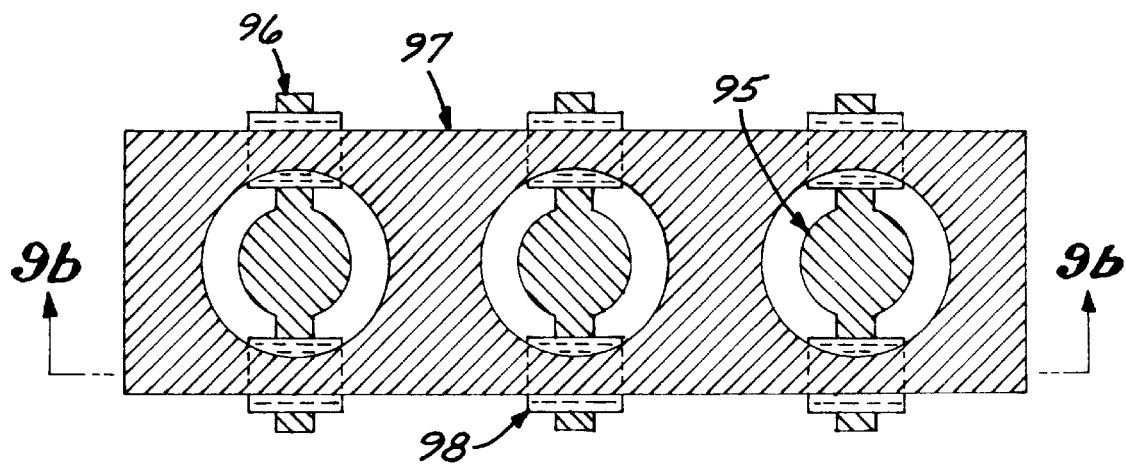
FIG. 9(a) shows the device constructed with the second insulating layer limited to those areas where isolation is needed between the drive lines and pickup lines and FIG. 9(b) is a cross-section along line A—A of FIG. 9(a)
Figure 9B:
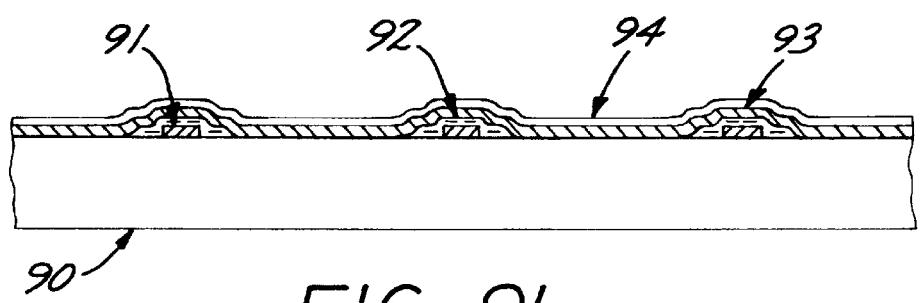

FIGS. 9(a) and 9(b) show how a sensor is constructed with the second insulating layer limited to those areas where isolation is required between the drive lines and the pickup lines. This reduces the need for resolution and accuracy in patterning the insulating layer providing insulation between the drive and pickup lines. This is particularly useful when this layer cannot be accurately patterned, such as when some plastic materials are used for the layer. A first conducting layer 91 is placed on an insulating substrate 90. This layer is used to form the pickup electrodes 95 and pickup lines 96. Insulating areas 98 are formed in a second insulating layer 92 where necessary for insulation between the pickup lines 96 and the combined drive lines and drive electrodes 97. The drive lines and drive electrodes are formed in a third conducting layer 93. A fourth insulating layer 94 is placed on top of the previous layer to provide protection for the array.

Figure 10A:
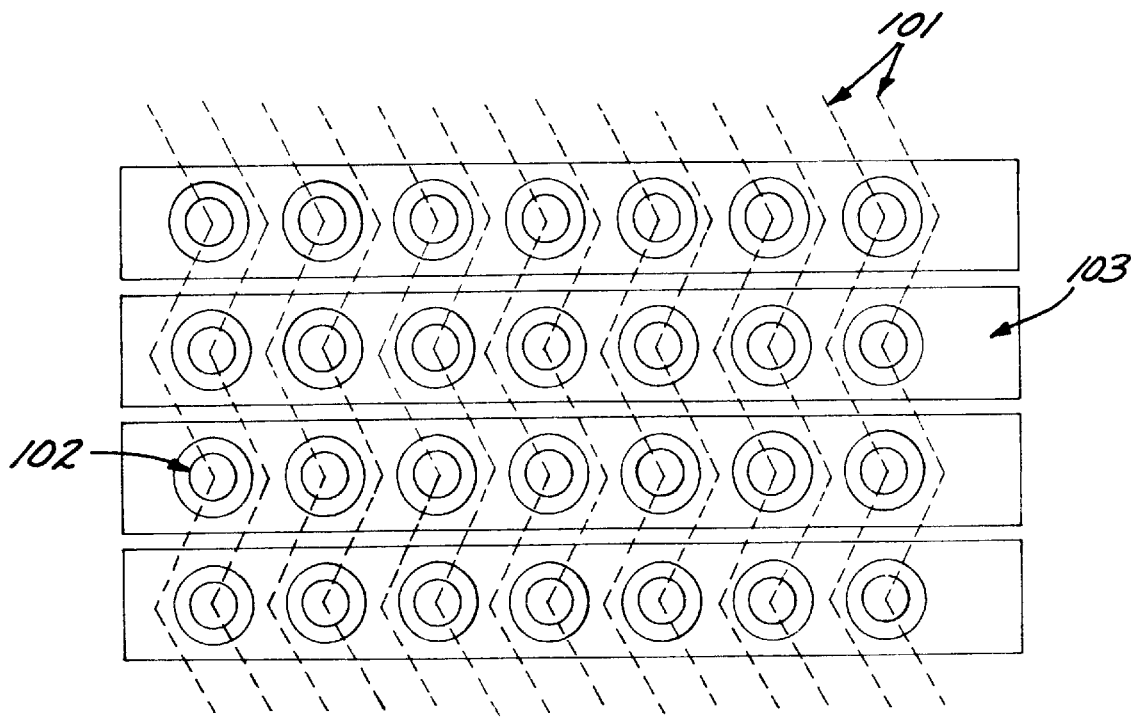
FIG. 10(a) shows every other row of pickup pads connected by zip-zagging parallel (substantially parallel) pickup lines and FIG. 10(b) shows every other row of pickup pads connected by staggering the pickup lines.
Figure 10B:
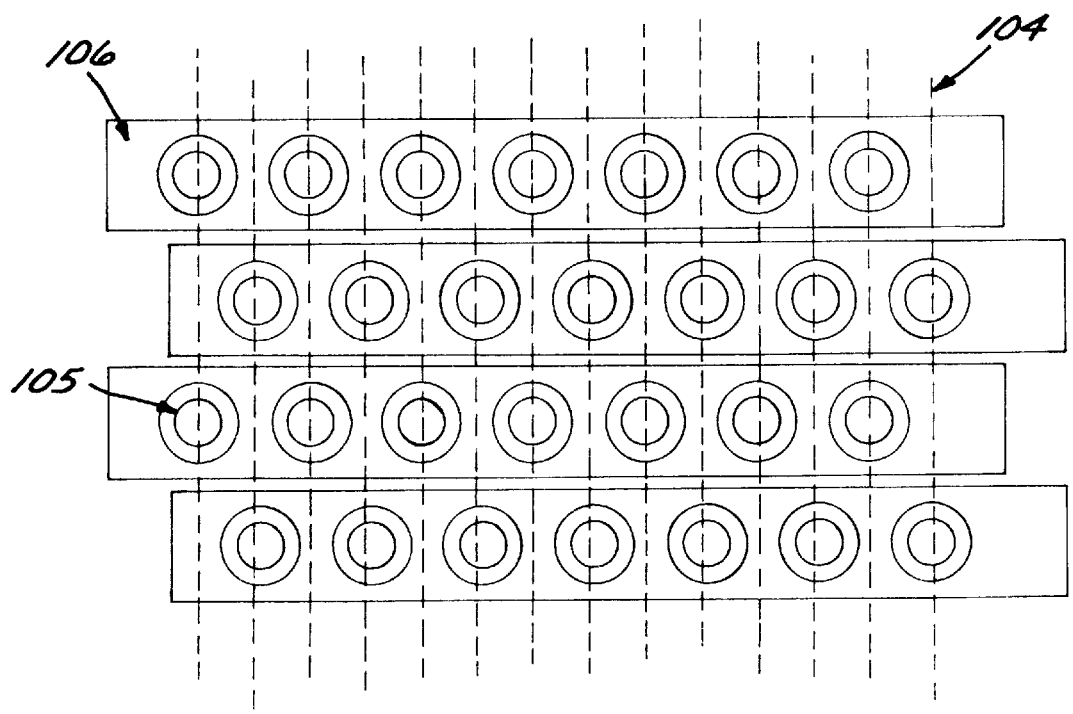

FIGS. 10(a) and 10(b) show how every other alternating pickup electrodes can be connected along a given pickup line. This achieves less cross talk between the nearest neighbor pickup electrodes since the connected pickup electrodes are farther away from each other. FIG. 10(a) shows pickup electrodes 102 disposed in the square matrix array layout, and pickup lines 101 are in a zig-zag form, rather than in straight lines. The pickup lines are thus substantially parallel. FIG. 10(b) shows a configuration where the pickup electrodes 105 are staggered row to row, and the pickup lines 104 are straight parallel lines. Similarly, every third pickup electrode can be connected, and so on. In the examples above, the drive electrodes 103, 106 are connected along the row, and the drive electrodes and the drive lines are in integrated form. Instead of the straight line boundaries between the rows of the integrated drive electrode/lines, sinusoidal boundary lines can be provided.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An array of one or two dimensional patterns of pixels for sensing surface modulations of an external impinging body, said array comprising a first conductive layer and first and second insulation layers, said first conductive layer being patterned into an array of pixels, each of said pixels containing a drive electrode and a pickup electrode with a gap therebetween and a second patterned conductive layer, said array not including an integrated circuit.

2. The device of claim 1 wherein said drive electrodes are connected in substantially parallel rows or columns terminating at the periphery of said array.

3. The device of claim 2 wherein each of said pickup electrodes are connected in substantially parallel rows or columns but different from the connection of said drive electrodes and terminating at the periphery of said array.

4. The device of claim 1 further including a third conductive layer interposed as a shield layer between said first and second conductive layers, said shield layer preventing cross talk due to electric fields between first and second conductive layers.

5. The device of claim 1 wherein said drive electrodes are connected at the edge of said array to a drive signal consisting of a voltage supplied from a low impedance source and said drive signal is of a time varying nature.

6. The device of claim 5 wherein one line of said drive electrodes is driven at any given time and the other inactive drive electrodes are connected to ground.

7. The device of claim 6 wherein external pickup electronics with low input impedance and sensitive to either charge or current are connected to the ends of said signal pickup lines.

8. The device of claim 7 where the signals from said pickup electronic circuits are combined by multiplexing to form a lesser number of signal channels.

9. The device of claim 1, wherein additional electrodes are added to the periphery of said array, said additional electrodes being driven with a different voltage from the rest of said pixels such that the effects of parasitic capacitance in said sensor structure are substantially canceled.

10. An array of one or two dimensional pattern of pixels for sensing the presence of an external material, said array comprising first and second conductive layers and first and second insulation layers, said first conductive layer being patterned into an array of pixels, each said pixel containing a drive electrode and a pickup electrode with a gap therebetween, said first insulation layer being positioned over said pixel array and said second insulation layer being interposed between said first and second conductive layers and a second patterned conductive layer, said array not including an integrated circuit.

11. The array of claim 10 wherein said material is moisture.

12. The array of claim 10 wherein said material is chemicals.

* * * * *